Sept. 22, 1953 J. F. ANDERSON 2,653,193

HEADSET FOR SUPPORTING A TELEPHONE

Filed May 10, 1949

INVENTOR.
John F. Anderson
BY [signature]
Atty.

Patented Sept. 22, 1953 2,653,193

UNITED STATES PATENT OFFICE 2,653,193

HEADSET FOR SUPPORTING A TELEPHONE

John F. Anderson, Seattle, Wash.

Application May 10, 1949, Serial No. 92,398

1 Claim. (Cl. 179—156)

This invention relates to improvements in head sets for supporting a telephone in connection with a collar and its attachments, secured to a telephone receiver.

The purpose of the invention is to provide a support for the ordinary telephone receiver or the usual French type of telephone commonly called a handset, which will readily permit of the instrument being held in the desired position to conveniently receive or speak without the necessity of or in any way using the hands to hold the instrument while in use.

A further object of the invention is to provide a head set, properly connected to a collar of a telephone receiver, permitting of flexibility when either applying or using the head set.

The invention also aims to provide a head set with its collar and attachments to the telephone receiver, which will insure of the instrument, when positioned and properly supported, being retained as adjusted on the head, without in any way requiring the use of the operator's hands in the telephoning operation.

The invention is illustrated in the accompanying drawings, wherein.

Figures 1, 2, 3, 4, 8, 9:
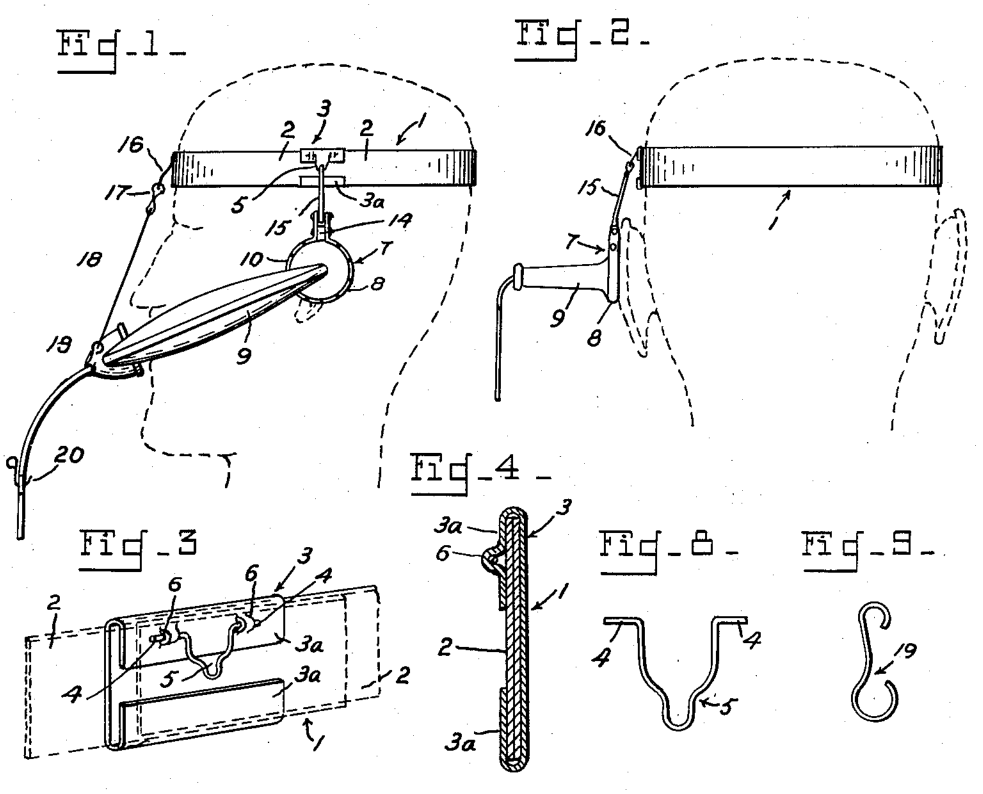
Figure 1 is a side view conventionally indicating how the head set is used in connection with a French telephone.
Figure 2 is a similar view showing the head set used in connection with a receiver of a Bell telephone.
Figure 3 is a view of a clamp.
Fig. 4 is a section of the clamp engaging the two opposite ends of the head band.
Figs. 8 and 9 are views of loops employed in connection with the holder.
Figures 5, 6:
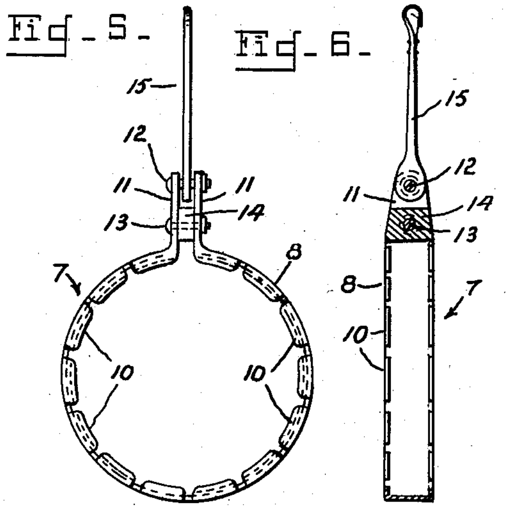
Fig. 5 is a view of the telephone holder or collar.
Fig. 6 is a section of the same.
Figure 7:
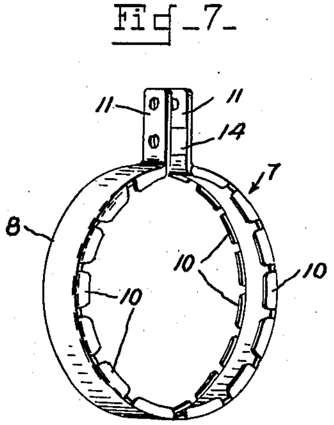
Fig. 7 is a perspective view of the telephone holder.

In the form of the invention illustrated in Figure 1 the invention is shown to support a known French type of telephone on the head of an operator. In this figure, 1 indicates a flat resilient head encircling band, comprising a strip bent circular with its free ends 2—2 shown overlapping. The overlapped ends are substantially embraced by a clamping element 3, the ends 3*a*—3*a* of this element being bent over and toward each other to snugly embrace the overlapped ends 2—2 of the resilient band. The upper turned in end 3*a* is formed with several aligned openings or spaced pairs of cuts with the parts therebetween pressed out to form a pair of pivot eyes to pivotally receive the outturned ends 4—4 of a depending loop 5 which is thereby swingingly suspended or hung from band 1 at one side of the head above an ear.

7 indicates a telephone instrument holder including an elastic or moldable collar 8, shaped in cross section to snugly embrace the flanged end of phone 9. To provide flexibility to properly engage the phone, the collar is fluted or kerfed at its edges, as shown at 10, while the ends, beyond the flutes or kerfs, are extended and spaced apart, as shown at 11. Connecting the extended ends 11, are two bolts 12 and 13, the bolt 13 passing through a spacer 14, to leave the central portion of the bolt 12 free for the mounting of a hook 15.

The hook 15 is snapped into the loop 5 having a narrowed or restricted bight to centralize the hook, to support the instrument from the band, as will be later described.

On the front of the band 1 is an apertured lip 16, and engaging this lip is a hook 17 attached to a flexible suspension strand or cord 18. The opposite end of the cord 18 is provided with a form of double hook 19 to engage the cord 18 and wires extending from the end of the telephone. A hooked loop 20 is secured to the wires, so that if the operator desires, the cord 18 can be detached from the band 1 by disengaging hook 17 from lip 16, and the hook 17 engaged in the loop 20 to get it out of the way, after which hook 15 may be disengaged from loop 5, leaving the telephone free from the head band.

If the invention is to be used in connection with an ordinary Bell receiver, the support, cord 18 or parts 16, 17, 18, 19 and 20 at the front of the band 1 is dispensed with. As shown in Figs. 1 and 2 the collar 8 is engaged over the flanged end of the receiver 9 which is supported on the head by being suspended through the connections between the collar and the band comprised by hook 15 in loop 5, in exactly the same manner, as the French telephone is supported at the rear end and above the ear.

In operation, all the elements are allowed to remain connected so that when the telephone rings, all that it is necessary to do, in the French type telephone, is to raise the receiver from the stand, or box on the wall, and place the pre-adjusted head band on the head. The receiver automatically hangs from the head band so that it fits the ear and mouth, and the conversation may commence immediately, with both hands free for other duties.

If, for any reason it is desired to disconnect the head band from the collar on the receiver, this may be done by means of the hook 15 at the ear, coming from the collar on the receiver, and the hook 17 on the cord 18 attached to the clamp or lip 16 on the head band in the middle of the forehead. The hook 17 can then be engaged in the hooked loop 20 on the telephone cord.

In the Bell type of receiver, the head band is left attached to the hook, connecting with the collar of the receiver, so that when the telephone rings, all that needs to be done is to remove the receiver from the hook on the telephone stand or wall box, place the head band, and collar held receiver on the ear. The receiver will be pulled to the ear, allowing both hands to be free for other duties.

If for any reason it is desired to disconnect the head band from the collar on the receiver, this may be done by means of the hook at the ear.

Obviously, because of the nature of the parts, the improvement is sufficiently flexible to be adjusted to appropriately support the telephone adjacent the ear and mouth of the operator.

When using the invention with an ordinary Bell type receiver, the latter is supported solely by the direct connection of the hook with the head band above the ear. When this kind of receiver is used, it extends outwardly from the ear as shown in Figure 2.

The invention is simple, it is flexible, and thus permits ready and snug fitting of the instrument to the head and leaves the hands of the operator entirely free of the instrument when the latter is in use.

What I claim is:

Means for supporting a telephone handset including a receiver and a transmitter, comprising a wide resilient and adjustable head band to encircle the head, the opposite ends of the head band overlapping, a clamp, the upper and lower ends of said clamp being bent over toward each other to snugly embrace and overlap the ends of the resilient head band, the upper turned-in bent portion of the clamp having aligned openings, a loop having its end portions extended outwardly to form pivots to fit in the aligned openings in the clamp, an adjustable collar to fit over the flanged end of the receiver end of the handset, the free ends of the collar being spaced apart, the edges of the collar having a series of spaced-apart inwardly extended radial lugs to fit over the flange of the receiver end of the handset, a hook pivoted at its upper end to the loop and having its lower end pivoted between the spaced-apart free ends of the collar, and a flexible connection extending downwards from the forward portion of the head band to engage and adjust the transmitting end of the handset up or down or sideways to fit the transmitter end of the handset to the mouth of different forms of faces.

JOHN F. ANDERSON.

References Cited in the file of this patent

UNITED STATES PATENTS

| Number | Name | Date |
|---|---|---|
| 1,866,043 | Konigsberger | July 5, 1932 |
| 1,951,332 | Barclay | Mar. 20, 1934 |

FOREIGN PATENTS

| Number | Country | Date |
|---|---|---|
| 287,409 | Germany | Sept. 21, 1915 |
| 383,102 | Germany | Oct. 16, 1923 |
| 385,650 | Germany | Dec. 11, 1923 |